United States Patent
Tsuchiya et al.

(10) Patent No.: US 12,401,038 B2
(45) Date of Patent: Aug. 26, 2025

(54) NEGATIVE ELECTRODE MATERIAL FOR LITHIUM ION SECONDARY BATTERY, PRODUCTION METHOD FOR NEGATIVE ELECTRODE MATERIAL FOR LITHIUM ION SECONDARY BATTERY, NEGATIVE ELECTRODE MATERIAL SLURRY FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: HITACHI CHEMICAL COMPANY, LTD., Tokyo (JP)

(72) Inventors: Hideyuki Tsuchiya, Tokyo (JP); Takashi Sakamoto, Tokyo (JP); Takeshi Masayoshi, Tokyo (JP); Kento Hoshi, Tokyo (JP); Takayuki Miyauchi, Tokyo (JP); Takashi Kubota, Tokyo (JP)

(73) Assignee: Resonac Corporation, Tokyo (JP)

( * ) Notice: Subject to any disclaimer, the term of this patent is extended or adjusted under 35 U.S.C. 154(b) by 831 days.

(21) Appl. No.: 17/042,171

(22) PCT Filed: Mar. 28, 2018

(86) PCT No.: PCT/JP2018/012983
§ 371 (c)(1),
(2) Date: Sep. 27, 2020

(87) PCT Pub. No.: WO2019/186829
PCT Pub. Date: Oct. 3, 2019

(65) Prior Publication Data
US 2021/0083288 A1    Mar. 18, 2021

(51) Int. Cl.
*H01M 4/587* (2010.01)
*H01M 4/02* (2006.01)
(Continued)

(52) U.S. Cl.
CPC ......... *H01M 4/587* (2013.01); *H01M 4/0433* (2013.01); *H01M 4/133* (2013.01);
(Continued)

(58) Field of Classification Search
CPC .... H01M 4/587; H01M 4/133; H01M 4/1393; H01M 4/622; H01M 4/362;
(Continued)

(56) References Cited

U.S. PATENT DOCUMENTS

| 6,344,296 B1 | 2/2002 | Ishii et al. | |
| 2014/0001400 A1* | 1/2014 | Sugihara | H01M 4/04 252/182.1 |

(Continued)

FOREIGN PATENT DOCUMENTS

| JP | 2002083587 | 3/2002 |
| JP | 2004196609 | 7/2004 |

(Continued)

OTHER PUBLICATIONS

"International Search Report (Form PCT/ISA/210) of PCT/JP2018/012983," mailed on May 15, 2018, with English translation thereof, pp. 1-4.

*Primary Examiner* — Eugenia Wang
(74) *Attorney, Agent, or Firm* — JCIPRNET

(57) ABSTRACT

This negative electrode material for lithium ion secondary batteries has a C of 5.5 or less, C being a value obtained from a formula C=(pressure B−pressure A)/(1.70−1.35), where pressure A (kN/cm$^2$) is defined as the pressure at which, when a 3.0 g specimen packed into a column space having a diameter of 15 mm is pressed down at a rate of 10 mm/min, a density of 1.35 g/cm$^3$ is obtained, and pressure B (kN/cm$^2$) is defined as the pressure at which a density of 1.70 g/cm$^3$ is obtained.

2 Claims, 1 Drawing Sheet

(51) Int. Cl.
  *H01M 4/04* (2006.01)
  *H01M 4/133* (2010.01)
  *H01M 4/1393* (2010.01)
  *H01M 4/36* (2006.01)
  *H01M 4/62* (2006.01)
  *H01M 10/0525* (2010.01)

(52) U.S. Cl.
  CPC ......... *H01M 4/1393* (2013.01); *H01M 4/362* (2013.01); *H01M 4/622* (2013.01); *H01M 10/0525* (2013.01); *H01M 2004/021* (2013.01); *H01M 2004/027* (2013.01)

(58) Field of Classification Search
  CPC ....... H01M 10/0525; H01M 2004/027; H01M 2004/021; Y02E 60/10
  See application file for complete search history.

(56) References Cited

U.S. PATENT DOCUMENTS

| 2016/0226060 | A1* | 8/2016 | Uchida | H01M 10/0525 |
| 2017/0207457 | A1* | 7/2017 | Yue | H01M 4/661 |
| 2018/0287208 | A1* | 10/2018 | Sasaki | H01M 4/13 |

FOREIGN PATENT DOCUMENTS

| JP | 2009245613 | 10/2009 |
| JP | 2011238622 | 11/2011 |
| JP | 2013211254 | 10/2013 |
| JP | 2013258130 | 12/2013 |
| JP | 2017045574 | 3/2017 |
| JP | 2017062992 | 3/2017 |
| TW | 201545977 | 12/2015 |
| WO | 2015147012 | 10/2015 |

* cited by examiner

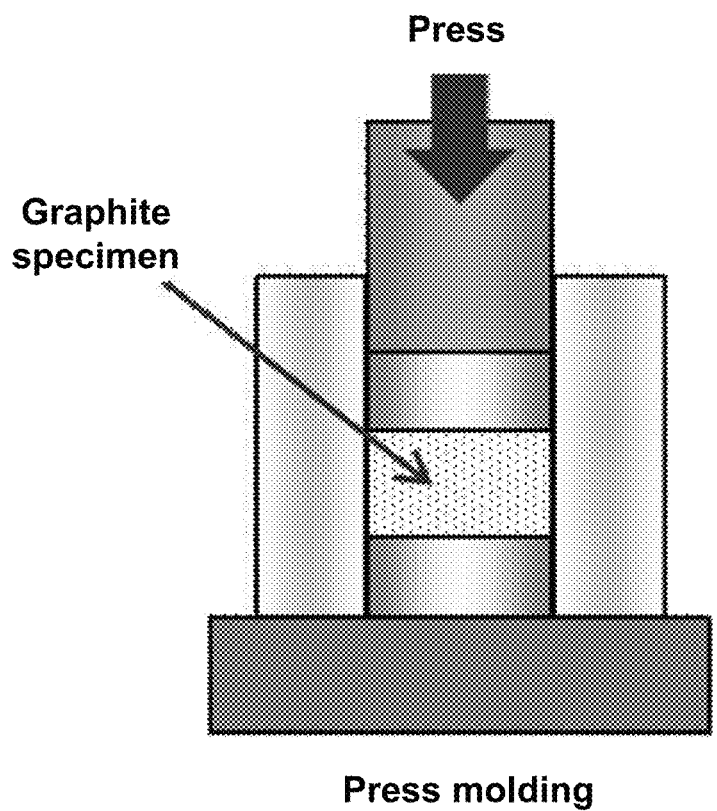

NEGATIVE ELECTRODE MATERIAL FOR LITHIUM ION SECONDARY BATTERY, PRODUCTION METHOD FOR NEGATIVE ELECTRODE MATERIAL FOR LITHIUM ION SECONDARY BATTERY, NEGATIVE ELECTRODE MATERIAL SLURRY FOR LITHIUM ION SECONDARY BATTERY, NEGATIVE ELECTRODE FOR LITHIUM ION SECONDARY BATTERY, AND LITHIUM ION SECONDARY BATTERY

CROSS-REFERENCE TO RELATED APPLICATION

This application is a 371 application of the International PCT application serial no. PCT/JP2018/012983, filed on Mar. 28, 2018. The entirety of each of the above-mentioned patent applications is hereby incorporated by reference herein and made a part of this specification.

TECHNICAL FIELD

The present invention relates to a negative electrode material for lithium ion secondary batteries, a production method for a negative electrode material for lithium ion secondary batteries, a negative electrode material slurry for lithium ion secondary batteries, a negative electrode for lithium ion secondary batteries, and a lithium ion secondary battery.

BACKGROUND ART

Because lithium ion secondary batteries have a higher energy density than other secondary batteries such as nickel-cadmium batteries, nickel-hydride batteries, and lead-acid batteries, they are widely used as power sources for portable electrical appliances such as laptop computers and mobile phones. Furthermore, in recent years, use of lithium ion secondary batteries has significantly expanded not only for relatively small electrical appliances but also for electric vehicles, power sources for power storage, and the like.

In accordance with the diversification of usage applications of lithium ion secondary batteries, further densification of negative electrodes is required to meet demands for smaller size, higher capacity, higher input/output, cost reduction, and the like for lithium ion secondary batteries. In particular, because a lithium ion secondary battery used for an electric vehicle or a power source for power storage is large in size, and a total energy is extremely large, it is difficult to realize compatibility of ensuring safety and reduction in space, and therefore there is high demand for measures for this.

Graphite particles such as natural graphite, which are widely used as a negative electrode material for lithium ion secondary batteries, have a flat shape, and therefore they have a low bulk density when used for negative electrodes. In addition, when a negative electrode produced using these particles is pressed down for densification, there is a problem in which the particles tend to be oriented along a direction parallel to a current collector surface, which reduces permeability of an electrolyte solution from an electrode surface side to a current collector side. Accordingly, a carbon material (spheroidal graphite) in which flat graphite particles are spheroidized to increase a density has been used for a negative electrode material that can handle densification of lithium ion secondary batteries (refer to, for example, Patent Literature 1).

CITATION LIST

Patent Literature

[Patent Literature 1]
Japanese Patent Laid-Open No. 2004-196609

SUMMARY OF INVENTION

Technical Problem

Because spheroidal graphite is densified in a process of spheroidizing flat graphite particles, a high-density negative electrode can be manufactured by using it. Meanwhile, it was revealed by examination of the inventors of the present invention that, when a negative electrode produced by using spheroidal graphite is further pressed, the charge and discharge efficiency of a battery formed of this negative electrode may be reduced. As the reason for this, it is thought that application of a pressing pressure causes cracks in the spheroidal graphite or an amorphous carbon layer covering the spheroidal graphite, which increases the number of active sites for side reactions. Accordingly, there is a demand for the development of a negative electrode in which the number of unnecessary reaction active sites due to crushing of negative electrode particles does not increase even when a negative electrode having a high capacity and coated with particles is densified.

Because a level of densification required for negative electrodes has tended to increase in recent years, it is expected that a pressing pressure will further increase, and technology that can inhibit deterioration of battery performance such as charge and discharge efficiency while pursuing densification of negative electrodes is becoming more important.

In view of the above circumstances, an objective of the present invention is to provide a negative electrode material for lithium ion secondary batteries, a production method for a negative electrode material for lithium ion secondary batteries, a negative electrode material slurry for lithium ion secondary batteries, a negative electrode for lithium ion secondary batteries, and a lithium ion secondary battery, which enables compatibility of densification and maintenance of charge and discharge efficiency.

Solution to Problem

Specific means for achieving the above-mentioned objective include the following aspects.

<1> A negative electrode material for lithium ion secondary batteries, in which a value C obtained from a pressure A and a pressure B in the following formula is 5.5 or less, where the pressure A ($kN/cm^2$) is defined as a pressure at which a density of 1.35 $g/cm^3$ is obtained when a 3.0 g specimen packed into a column space having a diameter of 15 mm is pressed down at a rate of 10 mm/min, and the pressure B ($kN/cm^2$) is defined as a pressure at which a density of 1.70 $g/cm^3$ is obtained.

$$C = (\text{pressure } B - \text{pressure } A)/(1.70 - 1.35)$$

<2> The negative electrode material for lithium ion secondary batteries according to <1>, including a plurality of flat graphite particles in a state of being aggregated or bonded such that main surfaces thereof are not parallel.

<3> The negative electrode material for lithium ion secondary batteries according to <1> or <2>, in which an oil absorption capacity is 50 ml/100 g or more.

<4> The negative electrode material for lithium ion secondary batteries according to any one of <1> to <3>, in which a volume average particle size is 5 μm to 40 μm.

<5> The negative electrode material for lithium ion secondary batteries according to any one of <1> to <4>, in which a specific surface area is 1.0 m$^2$/g to 10 m$^2$/g.

<6> A production method for the negative electrode material for lithium ion secondary batteries according to any one of <1> to <5>, the production method including: a step (a) of obtaining a mixture containing a graphitizable aggregate or graphite and a graphitizable binder; and a step (b) of graphitizing the mixture.

<7> A negative electrode material slurry for lithium ion secondary batteries, including: the negative electrode material for lithium ion secondary batteries according to any one of <1> to <5>; an organic binding material; and a solvent.

<8> A negative electrode for lithium ion secondary batteries, including: a current collector; and a negative electrode material layer which contains the negative electrode material for lithium ion secondary batteries according to any one of <1> to <5> and is formed on the current collector.

<9> A lithium ion secondary battery including: a positive electrode; an electrolyte; and the negative electrode for lithium ion secondary batteries according to <8>.

Advantageous Effects of Invention

According to the present invention, a negative electrode material for lithium ion secondary batteries, a production method for a negative electrode material for lithium ion secondary batteries, a negative electrode material slurry for lithium ion secondary batteries, a negative electrode for lithium ion secondary batteries, and a lithium ion secondary battery, which enables compatibility of densification and maintenance of charge and discharge efficiency, are provided.

BRIEF DESCRIPTION OF DRAWINGS

FIGURE is a schematic cross-sectional view showing a configuration of an apparatus used in a press test.

DESCRIPTION OF EMBODIMENTS

Hereinafter, embodiments for carrying out the present invention will be described in detail. However, the present invention is not limited to the following embodiments. In the following embodiments, constituent elements (including element steps and the like) are not essential unless otherwise specified except for a case in which they are considered clearly necessary in principle. The same applies to numerical values and a range thereof, which do not limit the present invention.

In the present disclosure, the term "step" means not only a step independent from other steps, but also a step that is not clearly distinguished from other steps as long as the purpose of the step is achieved.

In the present disclosure, a numerical value range expressed using "to" includes numerical values before and after "to" as a minimum value and a maximum value.

In stepwise numerical value ranges stated in the present disclosure, the upper limit value or the lower limit value stated in one numerical value range may be replaced with the upper limit value or the lower limit value of another stated stepwise numerical value range. In addition, in a numerical value range described in the present disclosure, the upper limit value or the lower limit value of this numerical value range may be replaced with values shown in Examples.

Regarding respective components in the present disclosure, a plurality of substances corresponding thereto may be contained. In a case where a plurality of substances corresponding to respective components is present in a composition, a proportional content or content of each component means a total content rate or content of the plurality of substances corresponding thereto present in the composition unless otherwise specified.

In the present disclosure, a plurality of types of particle corresponding to each component may be included. In a case where a plurality of types of particle corresponding to the respective components is present in the composition, a particle size of each component means a value of a mixture of the plurality of types of particle corresponding thereto present in the composition unless otherwise specified.

In the present disclosure, the term "layer" or "film" refers to not only a case of being formed over the entire region but also a case of being formed only in a part of the region when observing the region in which the layer or film is present.

<Negative Electrode Material for Lithium Ion Secondary Batteries>

In a negative electrode material for lithium ion secondary batteries of the present disclosure (hereinafter, also simply referred to as a negative electrode material), a value C obtained from a pressure A and a pressure B in the following formula is 5.5 or less, where the pressure A (kN/cm$^2$) is defined as a pressure at which a density of 1.35 g/cm$^3$ is obtained when a 3.0 g specimen packed into a column space having a diameter of 15 mm is pressed down at a rate of 10 mm/min, and the pressure B (kN/cm$^2$) is defined as a pressure at which a density of 1.70 g/cm$^3$ is obtained.

$$C=(\text{pressure }B-\text{pressure }A)/(1.70-1.35)$$

According to the examination conducted by the inventors of the present invention, it was found that, densification and maintenance of charge and discharge efficiency are compatible in a negative electrode material in which a difference between a pressure applied to set a density of a sample to 1.35 g/cm$^3$ and a pressure applied to set a density to 1.70 g/cm$^3$ under the above-mentioned measurement conditions is a certain value or less. The reason for this is not necessarily clear, but it is thought that in this case, a pressing pressure required to obtain a desired density is relatively small, a load on the negative electrode material due to pressing is reduced, and therefore cracks and the like are less likely to occur, and generation of side reactions due to a new surface is inhibited.

From the viewpoint of achieving compatibility of densification and favorable maintenance of charge and discharge efficiency, a value C obtained by the above formula is preferably 5.0 or less, and is more preferably 4.5 or less.

A specific method of measuring the pressure A (kN/cm$^2$) and the pressure B (kN/cm$^2$) of the negative electrode material used for calculating the value C is not particularly limited. For example, measurement can be performed by the following method using an apparatus having a configuration as shown in FIGURE.

A die having a diameter of 15 mm is filled with 3.0 g of a sample and compressed at a constant speed of 10 mm/min using an AUTOGRAPH (for example, manufactured by Shimadzu Corporation). In this compression, a distance from a bottom surface of the sample to a pressed surface is measured, and this distance is multiplied by a bottom area of the die (1.767 cm²) to calculate a density during pressing from a volume of the sample. A pressing hammer of an Autograph is equipped with a load cell and measures an applied pressure when a predetermined density is reached.

The negative electrode material is not particularly limited as long as it satisfies the above-mentioned conditions, but it is preferably a carbon material. When the negative electrode material is a carbon material, it may consist of only a carbon material or may contain a different element. Examples of carbon materials include natural graphite such as vein graphite, amorphous graphite, and spheroidal graphite, graphite such as artificial graphite, amorphous carbon, carbon black, fibrous carbon, nanocarbon, and the like. A carbon material contained in the negative electrode material may be only one kind or a combination of two or more kinds.

Furthermore, the negative electrode material may contain particles containing an element capable of occluding and releasing lithium ions. An element capable of occluding and releasing lithium ions is not particularly limited, and examples thereof include Si, Sn, Ge, In, and the like.

The negative electrode material may include particles (hereinafter, also referred to as graphite secondary particles) in a state in which a plurality of flat graphite particles is aggregated or bonded such that main surfaces thereof are not parallel. When the negative electrode material is in this state with respect to secondary graphite particles, a value C in a case of pressing under the above-mentioned conditions tends to be smaller than when the negative electrode material is spheroidal graphite. It is thought that the reason for this is because the influence of a pressure applied when pressing on individual graphite particles is reduced due to voids present between a plurality of flat graphite particles constituting graphite secondary particles, and thereby disruption of the graphite particles, generation of cracks, and the like are unlikely to occur.

The flat graphite particles are non-spheroidal graphite particles having anisotropy in shape. Examples of flat graphite particles include graphite particles having a vein-like shape, a flake-like shape, a partially lumpy shape, or the like.

An aspect ratio represented by A/B of the flat graphite particles is preferably, for example, 1.2 to 20, and is more preferably 1.3 to 10 when A is a length in a major axis direction and B is a length in a minor axis direction. When the aspect ratio is 1.2 or more, a contact area between particles increases, and conductivity tends to be further improved. When the aspect ratio is 20 or less, input and output characteristics such as rapid charge and discharge characteristics of a lithium ion secondary battery tend to be further improved.

The aspect ratio is obtained by observing graphite particles with a microscope, arbitrarily selecting 100 graphite particles, measuring A/B of each of the particles, and obtaining an arithmetic mean value of the measured values. In observing the aspect ratio, the length A in the major axis direction and the length B in the minor axis direction are measured as follows. That is, in a projected image of graphite particles is observed using a microscope, two parallel tangent lines circumscribing the outer periphery of the graphite particles, which are a tangent line a1 and a tangent line a2 having a maximum distance therebetween, are selected, and a distance between the tangent line a1 and the tangent line a2 is defined as the length A in the major axis direction. In addition, two parallel tangent lines circumscribing the outer periphery of the graphite particles, which are a tangent line b1 and a tangent line b2 having a minimum distance, are selected, and a distance between the tangent line b1 and the tangent line b2 is defined as the length B in the minor axis direction.

In the present disclosure, the sentence "main surfaces thereof are not parallel" regarding a plurality of flat graphite particles means that the largest cross-sectional surface (the main surface) of the plurality of the flat graphite particles is not aligned in a certain direction. Whether or not the main surfaces of the plurality of flat graphite particles are not parallel to each other can be confirmed by microscopic observation. When a plurality of flat graphite particles is aggregated or bonded in a state where the main surfaces thereof are not parallel to each other, an increase in regularity of orientation of the main surfaces of the flat graphite particles in the negative electrode is inhibited, conductivity is maintained, expansion of the negative electrode due to charging is inhibited, and thereby cycle characteristics of a lithium ion secondary battery tend to be improved.

Graphite secondary particles may partially include a structure in which a plurality of flat graphite particles is aggregated or bonded such that main surfaces thereof are parallel to each other.

Whether or not the flat graphite particles are aggregated or bonded in the graphite secondary particles can be confirmed by, for example, observation with a scanning electron microscope.

In the present disclosure, the phrase "state of being aggregated or bonded" regarding the plurality of flat graphite particles means a state in which two or more flat graphite particles are aggregated or bonded. The term "bonded" means a state in which particles are chemically bonded to each other directly or via a carbon substance. The term "aggregated" means a state in which particles are not chemically bonded to each other, but a shape of an aggregate is maintained due to an organic binder or a shape thereof. The flat graphite particles may be aggregated or bonded via a carbon substance. Examples of carbon substances include a carbon substance obtained by heat-treating an organic binding material containing at least one of a cyclic molecular structure or a chain molecular structure such as tar and pitch. The carbon substances are not particularly limited, and examples thereof include amorphous carbon, graphite, and the like. However, from the viewpoint of mechanical strength, the flat graphite particles are preferably bonded by graphite carbon graphitized at a high temperature of 2,000° C. or higher at which crystallinity starts to develop rapidly, rather than hard amorphous carbon heated to around 1,000° C. In a case of being bonded with graphite carbon, the flat graphite particles in the graphite secondary particles are more likely to move, and a pressing pressure tends to be released more easily.

An average particle size of the flat graphite particles is, for example, preferably 1 μm to 50 μm, more preferably 1 μm to 25 μm, and even more preferably 1 μm to 15 μm, from the viewpoint of easy aggregation or bonding. The average particle size of the flat graphite particles can be measured by a laser diffraction particle size distribution measuring device, and it is a particle size (D50) at 50% in a cumulative volume-based particle size distribution from the small diameter end.

The flat graphite particles and a raw material thereof are not particularly limited, and examples thereof include artificial graphite, vein natural graphite, flake natural graphite, coke, resin, tar, pitch, and the like. Among them, graphite obtained from artificial graphite, natural graphite, or coke has high crystallinity and becomes soft particles, and therefore in this case a density of the negative electrode tends to be easily increased.

The negative electrode material may include spheroidal graphite particles. Spheroidal graphite is less likely to be crushed, and this spheroidal graphite plays the role of a pillar during pressing. There is a case in which relatively large voids remain around the spheroidal graphite, which serves to allow bypassing when lithium ions move between a positive electrode and a negative electrode, resulting in improvement of charge and discharge characteristics.

Examples of spheroidal graphite particles include spheroidal artificial graphite, spheroidal natural graphite, and the like. The spheroidal graphite particles may be in a state of being contained in the above-mentioned graphite secondary particles (that is, a state in which the flat graphite particles and the spheroidal graphite particles are aggregated or bonded to form the graphite secondary particles), or it may be in a state of being mixed with the graphite secondary particles.

An average particle size of the spheroidal graphite particles is, for example, preferably 1 μm to 50 μm, more preferably 1 μm to 25 μm, and even more preferably 1 μm to 15 μm. The average particle size of the spheroidal graphite particles can be measured by a laser diffraction particle size distribution measuring device as in the case of the flat graphite particles, and it is a particle size (D50) at 50% in a cumulative volume-based particle size distribution from the small diameter end.

Examples of cases in which the negative electrode material contains graphite secondary particles and spheroidal graphite particles include a state in which the graphite secondary particles and the spheroidal graphite particles are mixed, a state in which the graphite secondary particles and the spheroidal graphite particles are bonded to each other (hereinafter, also referred to as composite particles), and the like. Examples of composite particles include particles in a state in which graphite secondary particles and spheroidal graphite particles are bonded via an organic carbide.

In the spheroidal graphite with a high degree of circularity, a particle thickness (that is, a depth per spheroidal graphite particle in a direction of a current collector as the particles are pressed down from an electrode surface in the electrode) is almost unchanged even when particles rotate due to a pressure applied by pressing. Meanwhile, flat primary particles rotate to release a pressure in pressing, a thickness (depth) in the direction of the current collector becomes smaller, and therefore a density near the electrode surface becomes higher than that near the current collector in some cases. The inventors of the present invention have found that suitable incorporation of spheroidal graphite having a high degree of circularity into the negative electrode material has a function of inhibiting uneven density in a direction from an electrode surface to a current collector when pressing the electrode. By inhibiting an uneven density, an electrolytic solution on the electrode surface is evenly present around particles, and thereby an effect of improving load characteristics such as rapid charging and discharging can be obtained. Meanwhile, as a content rate of spheroidal graphite in the negative electrode material increases, a post-pressurization density tends to decrease and an oil absorption capacity tends to decrease at the same time. Therefore, an amount of spheroidal graphite is preferably set in consideration of a desired post-pressurization density and an oil absorption capacity.

(Average Particle Size)

An average particle size of the negative electrode material is, for example, preferably 5 μm to 40 μm, more preferably 8 μm to 30 μm, and even more preferably 10 μm to 25 μm. The average particle size may be, for example, a volume average particle size measured by a laser diffraction/scattering method. Specifically, it may be a particle size (D50) at 50% in a cumulative volume-based particle size distribution from the small diameter end measured using a laser diffraction particle size distribution measuring device.

Examples of methods of measuring an average particle size when an electrode (negative electrode) is manufactured using a negative electrode material include a method in which a sample electrode is produced, and this electrode is embedded in epoxy resin and then mirror-polished to observe an electrode cross-sectional surface with a scanning electron microscope (for example, "VE-7800" manufactured by KEYENCE CORPORATION), a method in which an electrode cross-sectional surface is produced using an ion milling device (for example, "E-3500" manufactured by Hitachi High-Technology Co., Ltd.) and measured with a scanning electron microscope (for example, "VE-7800" manufactured by KEYENCE CORPORATION), and the like. The average particle size in this case is a median value of 100 particle sizes arbitrarily selected from the observed particles.

The sample electrode can be produced by, for example, producing a dispersion liquid in which water is added such that a viscosity of a mixture at 25° C. is 1,500 mPa·s to 2500 mPa·s, applying the dispersion liquid onto a copper foil having a thickness of 10 μm such that a thickness (at the time of application) of the dispersion liquid becomes about 70 μm, and thereafter drying it at 120° C. for 1 hour, in which a mixture of 98 parts by mass of a negative electrode material, 1 part by mass of styrene-butadiene resin as a binder, and 1 part by mass of carboxymethyl cellulose as a thickener is used as a solid content.

(Oil Absorption Capacity)

An oil absorption capacity of the negative electrode material is, for example, preferably 50 ml/100 g or more, more preferably 50 ml/100 g to 120 ml/100 g, and even more preferably 55 ml/100 g to 110 ml/100 g. The oil absorption capacity is an index showing a proportion of voids in the negative electrode material. When the oil absorption capacity of the negative electrode material is 50 ml/100 g or more, there are sufficient voids in particles for a buffering pressure during electrode pressing, and therefore graphite crystals rupturing in a case of attaining a high electrode density of 1.7 g/cm$^3$ or more tends to be inhibited, and various characteristics tend to be favorably maintained during use of a battery. When a high capacity is not required, it is not necessary to attain a high electrode density, and therefore an oil absorption capacity is not limited thereto. When an oil absorption capacity of the negative electrode material is 120 mL/100 g or less, an amount of water required to adjust a viscosity of a slurry to a desired viscosity can be reduced, and therefore the energy consumption during electrode drying can be saved.

In the present disclosure, an oil absorption capacity of the negative electrode material can be measured using a linseed oil (for example, manufactured by Kanto Chemical Co., Inc.) instead of using dibutyl phthalate (DBP) as a reagent liquid described in JIS K 6217-4: 2008 "Carbon Black for Rubber-Basic Characteristics-Part 4: Determination of Oil Absorption Capacity." Specifically, linseed oil is titrated into a target powder with a constant speed buret, and the change in viscosity characteristics is measured from a torque detector. An amount of linseed oil added per unit mass of the target powder, which corresponds to 70% of the generated maximum torque, is used as an oil absorption capacity (ml/100 g). As a measuring device, for example, it is possible to use an absorption amount measuring device manufactured by ASAHISOUKEN CORPORATION.

(Orientation)

Orientation of the negative electrode material is an index showing a degree of regularity of orientation of particles of the negative electrode material contained in the negative electrode. Little orientation means that particles of the negative electrode material are oriented in random directions. That is, this means that graphite particles are inhibited from being oriented along a surface of a current collector by a pressure during pressing.

In the present disclosure, the orientation of the negative electrode is determined using an X-ray diffractometer using Cu Kα rays as an X-ray source. Specifically, an X-ray diffraction pattern of a sample is measured, and the orientation is determined from an intensity of a carbon (002) plane diffraction peak detected at around a diffraction angle of 2θ=26° to 27° and a carbon (110) plane diffraction peak detected at around a diffraction angle of 2θ=70° to 80° by Formula (1).

(002) plane diffraction peak intensity/(110) plane diffraction peak intensity     Formula (1)

(Specific Surface Area)

A specific surface area of the negative electrode material is an index showing an area of an interface between the negative electrode material and the electrolytic solution. As a value of the specific surface area becomes smaller, an area of an interface between the negative electrode material and the electrolytic solution does not become excessively large, and therefore, an increase in a reaction field of a decomposition reaction of the electrolytic solution tends to be inhibited, thereby inhibiting gas generation, and initial charge and discharge efficiency tends to become favorable. Furthermore, as a value of the specific surface area becomes larger, a current density per unit area is less likely to increase rapidly and a load is reduced, and therefore, a charge and discharge efficiency, charge acceptability, rapid charge and discharge characteristics, and the like tend to be improved.

A specific surface area of the negative electrode material is not particularly limited, but for example, it is preferably 1.0 $m^2$/g to 10 $m^2$/g, and more preferably 1.5 $m^2$/g to 8.0 $m^2$/g.

The specific surface area of the negative electrode material can be measured by a BET method (nitrogen gas adsorption method). Specifically, nitrogen gas is adsorbed on a sample using a gas adsorption device (ASAP2010, manufactured by Shimadzu Corporation), the sample being obtained by filling a measurement cell with a negative electrode material and subjecting it to a heat pretreatment at 200° C. under vacuum degassing. BET analysis is performed on the obtained sample by a 5-point method to calculate a specific surface area.

A specific surface area of the negative electrode material can be set to a desired range by, for example, adjusting an average particle size (as an average particle size becomes smaller, a specific surface area tends to become larger, and as an average particle size becomes larger, a specific surface area tends to become smaller).

<Production Method for Negative Electrode Material for Lithium Ion Secondary Batteries>

A production method for a negative electrode material for lithium ion secondary batteries (hereinafter, also referred to as a production method for a negative electrode material) includes a step (a) of obtaining a mixture containing a graphitizable aggregate or graphite and a graphitizable binder; and a step (b) of graphitizing the mixture.

In the step (a), the graphitizable aggregate or graphite and the graphitizable binder are mixed to obtain the mixture. If necessary, a graphitization catalyst, a fluidity imparting agent, and the like may be added.

Examples of graphitizable aggregates include coke such as fluid coke, needle coke, and mosaic coke. Furthermore, aggregates that are already graphite such as natural graphite and artificial graphite may be used. The graphitizable aggregate or graphite is preferably a powder. A particle size of the graphitizable aggregate or graphite is preferably smaller than a particle size of the above-described flat graphite particles.

Examples of graphitizable binders include coal-based binders, petroleum-based binders, or artificial pitches and tars, thermoplastic resins, thermosetting resins, and the like.

A content of the graphitizable binder may be 5 to 80 parts by mass, 10 to 80 parts by mass, or 15 parts by mass to 80 parts by mass with respect to 100 parts by mass of the graphitizable aggregate or graphite.

Examples of graphitization catalysts include substances having a graphitization catalyst action such as silicon, iron, nickel, titanium, boron, vanadium, and aluminum; carbides, oxides, nitrides, and mica clay minerals of these substances; and the like.

When the graphitization catalyst is added, an amount of the graphitization catalyst is not particularly limited, but it may be 1 part by mass to 50 parts by mass with respect to 100 parts by mass of a total amount of the graphitizable aggregate or graphite and the graphitizable binder. When an amount of the graphitization catalyst is 1 part by mass or more, crystal development of graphite particles tends to be favorable, and a charge and discharge capacity tends to be favorable. On the other hand, when an amount of the graphitization catalyst is 50 parts by mass or less, workability tends to be favorable. In addition, it is preferable from the viewpoint of energy cost, because graphitization can be performed at a lower temperature than in the case where graphitization is performed without adding a graphitization catalyst.

When a graphitization catalyst is not added to a mixture, for example, the mixture can be graphitized by maintaining it at a high temperature for a long time. From the viewpoint of sufficient crystal development and obtaining a sufficient capacity, a temperature is preferably maintained at 2,500° C. or higher, and is more preferably maintained at 3,000° C. or higher.

From the viewpoint of facilitating molding of a mixture, the mixture preferably contains a fluidity imparting agent. In particular, when the mixture is molded by extrusion molding, the mixture preferably contains a fluidity imparting agent in order to mold the mixture while the mixture flows. Furthermore, incorporation of a fluidity imparting agent in the mixture leads to a reduction in an amount of graphitizable binder, and therefore, improvement in battery characteristics such as initial charge and discharge efficiency of the negative electrode material can be expected.

The type of fluidity imparting agent is not particularly limited. Specific examples thereof include hydrocarbons such as liquid paraffin, paraffin wax, and polyethylene wax; fatty acids such as stearic acid, oleic acid, erucic acid, and 12-hydroxystearic acid; fatty acid metal salts such as zinc stearate, lead stearate, aluminum stearate, calcium stearate, and magnesium stearate; fatty acid amides such as stearic acid amides, oleic acid amides, erucic acid amides, methylenebisstearic acid amides, and ethylenebisstearic acid amides; fatty acid esters such as stearic acid monoglyceride, stearyl stearate, and hardened oils; higher alcohols such as stearyl alcohol; and the like. Among them, fatty acids are preferable, and stearic acid is more preferable from the viewpoint that they are less likely to affect the performance of the negative electrode material, are easily handled because they are solid at room temperature, are uniformly dispersed and dissolve in the step (a), disappear in a process before a graphitization treatment, and are inexpensive.

When the mixture contains a fluidity imparting agent, an amount thereof is not particularly limited. For example, a content of the fluidity imparting agent with respect to a total amount of the mixture may be 0.1% by mass to 20% by mass, 0.5% by mass to 10% by mass, or 0.5% by mass to 5% by mass.

A method of mixing the graphitizable aggregate or graphite with the graphitizable binder is not particularly limited. For example, mixing can be performed using a kneader or the like. The mixing may be performed at a temperature equal to or higher than a softening point of the binder. Specifically, when the graphitizable binder is pitch, tar, or the like, a temperature may be 50° C. to 300° C., and when the graphitizable binder is a thermosetting resin, a temperature may be 20° C. to 100° C.

In the step (b), the mixture obtained in the step (a) is graphitized. Accordingly, graphitizable components in the mixture are graphitized. Graphitization is preferably performed in an atmosphere in which the mixture is unlikely to oxidize, and examples thereof include a method of heating in a nitrogen atmosphere, argon gas, or a vacuum. A temperature during graphitization is not particularly limited as long as it is a temperature at which the graphitizable component can be graphitized. For example, a temperature may be 1,500° C. or higher, 2,000° C. or higher, 2,500° C. or higher, or 2,800° C. or higher. An upper limit of the temperature is not particularly limited, but it may be 3,200° C. or lower, for example. When the temperature is 1,500° C. or higher, crystal change occurs. When the temperature is 2,000° C. or higher, graphite crystal development becomes favorable. When the temperature is 2,500° C. or higher, graphite crystal tends to develop into a high-capacity graphite crystal capable of storing more lithium ions, and an amount of the graphitization catalyst remaining after baking tends to be small, and an increase in an amount of ash tends to be curbed. In both cases, a charge and discharge capacity and cycle characteristics of a battery tend to become favorable. On the other hand, when the temperature during graphitization is 3,200° C. or lower, it is possible to inhibit sublimation of part of the graphite.

The production method of a negative electrode material may include at least one selected from the group consisting of a step (c) of molding a mixture and a step (d) of heat-treating the mixture, between the step (a) and the step (b).

A molding method in the step (c) is not particularly limited. For example, the mixture may be ground and put in a container such as a die. Alternatively, the mixture may be molded by extrusion molding in a state of maintaining its fluidity.

When the mixture is molded, a bulk density is increased, and therefore a packing amount in a graphitization furnace is increased, energy efficiency is increased, and thereby graphitization can be performed with energy saving. Furthermore, when the mixture contains a graphitization catalyst, molding reduces a distance between catalyst particles and graphitizable aggregates. As a result, a graphitization reaction proceeds in a short time, leading to further energy saving, and thereby the environmental load related to production can be reduced. In addition, molding further increases a bulk density, and control is performed such that the distance between particles is reduced, thereby increasing the catalyst utilization efficiency. As a result, loss caused by sublimation of the graphitization catalyst without being used in the graphitization reaction can be reduced.

Development of graphite crystals can be controlled freely by adjusting whether or not to perform molding of the mixture, a bulk density after molding, the type and a content of a graphitization catalyst, a temperature and a time of graphitization, and the like.

The heat treatment of the mixture in the step (d) is preferable from the viewpoint of removing volatile components contained in the mixture and inhibiting gas generation during the graphitization in the step (b). The heat treatment is more preferably performed after the mixture is molded in the step (c). The heat treatment is preferably performed at a temperature at which volatile components contained in the mixture are removed, and it may be performed at, for example, 500° C. to 1,000° C.

The obtained graphitized product may be ground and adjusted in particle size to obtain a desired particle size.

The graphitized product after graphitization and grinding may be subjected to an isotropic pressurization treatment. Examples of isotropic pressurization treatment methods include a method in which a container made of rubber or the like is filled with the graphitized product after grinding, the container is sealed, and then the container is subjected to an isotropic pressurization treatment with a press machine. When the graphitized product that has been subjected to the isotropic pressurization treatment is aggregated and solidified, it can be crushed with a cutter mill or the like and granulated with a sieve or the like.

The method described above is an example of the production method of a negative electrode material. The negative electrode material may be manufactured by methods other than the above-mentioned method.

(Negative Electrode Material Slurry for Lithium Ion Secondary Batteries)

A negative electrode material slurry for lithium ion secondary batteries of the present disclosure (hereinafter, also referred to as a negative electrode material slurry) contains the above-described negative electrode material, an organic binding material, and a solvent.

The organic binding material is not particularly limited. Examples thereof include polymer compounds including styrene-butadiene rubber, and ethylenically unsaturated carboxylic acid esters (methyl (meth)acrylate, ethyl (meth)acrylate, butyl (meth)acrylate, hydroxyethyl (meth)acrylate, and the like) as polymerization components; polymer compounds containing ethylenically unsaturated carboxylic acids (acrylic acid, methacrylic acid, itaconic acid, fumaric acid, maleic acid, and the like) as a polymerization component; and polymer compounds such as polyvinylidene fluoride, polyethylene oxide, polyepichlorohydrin, polyphosphazene, polyacrylonitrile, polyimide, and polyamideimide. In the present disclosure, (meth)acrylate means either or both of methacrylate and acrylate.

The solvent is not particularly limited. Examples thereof include water, an organic solvent, or a mixture thereof. Examples of organic solvents include N-methylpyrrolidone, dimethylacetamide, dimethylformamide, γ-butyrolactone, and the like.

The negative electrode material slurry may contain a thickener for adjusting a viscosity, if necessary. Examples of thickeners include carboxymethyl cellulose, methyl cellulose, hydroxymethyl cellulose, ethyl cellulose, polyvinyl alcohol, polyacrylic acid and salts thereof, oxidized starch, phosphorylated starch, casein, and the like.

The negative electrode material slurry may contain a conductive auxiliary agent, if necessary. Examples of conductive auxiliary agents include carbon black, graphite, graphene, acetylene black, carbon nanotubes, conductive oxides, conductive nitrides, and the like.

(Negative Electrode for Lithium Ion Secondary Batteries)

A negative electrode for lithium ion secondary batteries of the present disclosure (hereinafter, also referred to as a negative electrode) includes a current collector; and a negative electrode material layer which contains the above-described negative electrode material and is formed on the current collector.

A material and a shape of the current collector are not particularly limited. For example, it is possible to use a material such as a strip-shaped foil, a strip-shaped perforating foil, or a strip-shaped mesh made of a metal or alloy such as aluminum, copper, nickel, titanium, and stainless steel. Furthermore, it is also possible to use porous materials such as porous metal (foamed metal) and carbon paper.

A method of forming the negative electrode material layer containing the negative electrode material on the current collector is not particularly limited. For example, it can be carried out by a known method such as a metal mask printing method, an electrostatic coating method, a dip coating method, a spray coating method, a roll coating method, a doctor blade method, a gravure coating method, and a screen printing method. In a case of integrating the negative electrode material layer and the current collector, it can be carried out by a known method such as rolling, pressing, or a combination thereof.

The negative electrode obtained by forming the negative electrode material layer on the current collector may be subjected to a heat treatment. By the heat treatment, a solvent contained in the negative electrode material layer is removed, strength of a binder is increased due to hardening, and adhesiveness between particles and between the particles and the current collector can be improved. The heat treatment may be performed in an inert atmosphere of helium, argon, nitrogen, or the like or in a vacuum atmosphere in order to prevent oxidation of the current collector during the treatment.

The negative electrode may be pressed (pressurization treatment) before the heat treatment. An electrode density can be adjusted by the pressurization treatment. The electrode density may be 1.5 g/cm$^3$ to 1.9 g/cm$^3$, or 1.6 g/cm$^3$ to 1.8 g/cm$^3$. As an electrode density becomes higher, a volume capacity is further increased, and adhesiveness of the negative electrode material layer to the current collector tends to be improved.

(Lithium Ion Secondary Battery)

A lithium ion secondary battery of the present disclosure includes a positive electrode, an electrolyte, and the above-described negative electrode. The lithium ion secondary battery may include members other than these members as needed. The lithium ion secondary battery can be configured, for example, such that at least the negative electrode and the positive electrode are disposed to face each other with a separator interposed therebetween, and an electrolytic solution containing an electrolyte is injected.

The positive electrode can be obtained by forming a positive electrode layer on a surface of the current collector in the same manner as the negative electrode. As the current collector, it is possible to use a material such as a strip-shaped foil, a strip-shaped perforating foil, or a strip-shaped mesh made of a metal or alloy such as aluminum, titanium, and stainless steel.

A positive electrode material used for the positive electrode layer is not particularly limited. Examples thereof include metal compounds, metal oxides, metal sulfides, and conductive polymer materials which can be doped or intercalated with lithium ions. Furthermore, it is possible to use one or two or more kinds in combination from lithium cobalt oxide ($LiCoO_2$), lithium nickel oxide ($LiNiO_2$), lithium manganate ($LiMnO_2$), and complex oxides thereof ($LiCo_xNi_yMn_zO_2$, x+y+z=1, 0<x, 0<y; $LiNi_{2-x}Mn_xO_4$, 0<x≤2), lithium manganese spinel ($LiMn_2O_4$), lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine type $LiMPO_4$ (M: Co, Ni, Mn, Fe), conductive polymers such as polyacetylene, polyaniline, polypyrrole, polythiophene, and polyacene, porous carbon, and the like. Among them, lithium nickel oxide ($LiNiO_2$) and a complex oxide thereof ($LiCo_xNi_yMn_zO_2$, x+y+z=1, 0<x, 0<y; $LiNi_{2-x}Mn_xO_4$, 0<x≤2) have a high capacity, and thus are suitable as positive electrode materials. From the viewpoint of further increasing a capacity, nickel-cobalt-aluminum (NCA) positive electrode material is also suitably used.

Examples of separators include non-woven fabrics containing polyolefins such as polyethylene and polypropylene as a main component, cloth, microporous film, and a combination thereof. When the lithium ion secondary battery has a structure in which the positive electrode and the negative electrode are not in contact with each other, it is not necessary to use a separator.

As the electrolytic solution, it is possible to use so-called organic electrolyte solutions in which lithium salts such as $LiClO_4$, $LiPF_6$, $LiAsF_6$, $LiBF_4$, and $LiSO_3CF_3$ are dissolved a non-aqueous solvent containing a single component or a mixture of two or more components such as ethylene carbonate, propylene carbonate, butylene carbonate, vinylene carbonate, fluoroethylene carbonate, cyclopentanone, sulfolane, 3-methylsulfolane, 2,4-dimethylsulfolane, 3-methyl-1,3-oxazolidin-2-one, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolane, methyl acetate, and ethyl acetate. Among these, an electrolytic solution containing fluoroethylene carbonate is suitable because it tends to form a stable solid electrolyte interface (SEI) on a surface of the negative electrode material and significantly improves cycle characteristics.

A form of the lithium ion secondary battery is not particularly limited, and examples thereof include a paper type battery, a button type battery, a coin type battery, a laminate type battery, a cylindrical type battery, a prismatic battery, and the like. Furthermore, the negative electrode material for lithium ion secondary batteries can be applied not only to the lithium ion secondary batteries, but also to all electrochemical devices such as a hybrid capacitor having a charging and discharging mechanism of inserting and desorbing lithium ions.

Examples

Hereinafter, the above-described embodiment will be described more specifically based on examples, but the above-described embodiments are not limited to the following examples.

(1) The Following Material was Used as a Negative Electrode Material.

Negative electrode material 1: Mosaic coke (38 parts by mass) having a volume average particle size of 17 μm, natural graphite (20 parts by mass) containing spheroidal graphite having a volume average particle size of 22 μm and flake graphite, a tar pitch binder (30 parts by mass) having a softening point of 110° C., stearic acid (2 parts by mass) as a fluidity imparting agent, and silicon carbide (10 parts by mass) as a graphitization catalyst were heated and kneaded at 150° C., which was equal to or higher than a temperature at which the binder dissolved, to obtain a mixture. Next, the obtained mixture was extrusion-molded to obtain a molded product. This molded product was heat-treated to a maximum temperature of 2,500° C. or higher such that it was graphitized. The graphitized product thus obtained was subjected to an isotropic secondary treatment, grinding, and sieving, and secondary graphite particles thus obtained having an average particle size of 23 μm were used for a negative electrode material 1.

Negative electrode material 2 . . . Graphite secondary particles having an average particle size of 22 μm, which were obtained in the same manner as in the negative electrode material 1 except that a needle coke (65 parts by mass) having a volume average particle size of 10 μm was used as a raw material coke, and the natural graphite and graphitization catalyst were not used.

Negative electrode material 3 . . . Graphite secondary particles having a volume average particle size of 20 μm, which were obtained in the same manner as in the negative electrode material 1 except that the graphitization catalyst was changed to silicon dioxide (10 parts by mass).

Negative electrode material 4: A mixture of a negative electrode material C2 (80 parts by mass) and the negative electrode material 1 (20 parts by mass)

Negative electrode material 5: A mixture of the negative electrode material C2 (70 parts by mass) and the negative electrode material 1 (30 parts by mass)

Negative electrode material 6 . . . Graphite secondary particles having a volume average particle size of 16 μm, which were obtained in the same manner as in the negative electrode material 1 except that the same amount of a mosaic coke having a volume average particle size of 5 μm was used as the raw material coke and crushed after graphitization to 16 μm, and the isotropic secondary treatment was not performed.

Negative electrode material 7 . . . Graphite secondary particles having a volume average particle size of 16 μm, which were obtained in the same manner as in the negative electrode material 6 except that the mixture obtained by heating and kneading was not formed into a molded product.

Negative electrode material 8 . . . Graphite secondary particles having an average particle size of 18 μm and to which amorphous carbon was bonded, the graphite secondary particles being obtained by mixing the negative electrode material 6 (98 parts by mass) and tar pitch (2 parts by mass) having a softening point temperature of 90° C. and steaming the mixture at 1,025° C. The negative electrode material 8 was observed with a transmission electron microscope (TEM), and it was confirmed that amorphous carbon was present inside and outside the graphite secondary particles.

Negative electrode material 9 . . . A mixture of the negative electrode material C2 (70 parts by mass) and the negative electrode material 8 (30 parts by mass)

Negative electrode material 10 . . . A mixture (volume average particle size: 14.3 μm) of a negative electrode material C1 (30 parts by mass), a negative electrode material C6 (30 parts by mass), the negative electrode material 8 (30 parts by mass), and flat graphite particles (10 parts by mass) having a volume average particle size of 3 μm.

Negative electrode material 11 . . . A mixture (volume average particle size: 17.3 μm) of negative electrode material 5 (90 parts by mass) and highly crystalline flake graphite particles (10 parts by mass) graphitized at 2,000° C. or higher and having a volume average particle size of 11 μm.

When scanning electron microscope (SEM) observation was performed on the negative electrode materials 1 to 11, it was found that a plurality of flat graphite particles contained particles in a state of being aggregated or bonded such that main surfaces thereof were not parallel to each other.

Negative electrode material C1 . . . A negative electrode material having a volume average particle size of 18 μm, which was obtained by mixing spheroidal natural graphite particles (90 parts by mass) having a high tap density (0.95 g/cm$^3$) and a volume average particle size of 16 μm with tar pitch (10 parts by mass) having a softening point temperature of 90° C., and steaming the mixture at 1,025° C. The negative electrode material C1 was observed with a transmission electron microscope (TEM), and it was confirmed that amorphous carbon was present on a surface of the spheroidal natural graphite particles.

Negative electrode material C2 . . . A negative electrode material having a volume average particle size of 16 μm, which was obtained in the same manner as the negative electrode material C1 except that the spheroidal natural graphite particles had a low tap density (0.89 g/cm$^3$).

Negative electrode material C3 . . . A mixture of the negative electrode material C2 (90 parts by mass) and the negative electrode material 1 (10 parts by mass)

Negative electrode material C4 . . . A mixture of the negative electrode material C2 (90 parts by mass) and the negative electrode material 8 (10 parts by mass)

Negative electrode material C5 . . . A mixture of the negative electrode material C2 (80 parts by mass) and the negative electrode material 8 (20 parts by mass)

Negative electrode material C6 . . . A negative electrode material having a volume average particle size of 11 μm, which was obtained in the same manner as the negative electrode material C1 except that the spheroidal natural graphite particles had a volume average particle size of 10.0 μm and a high tap density (0.95 g/cm$^3$).

(Measurement of Oil Absorption Capacity, Orientation, and Specific Surface Area)

For each negative electrode material, an oil absorption capacity (ml/100 g), orientation, and a specific surface area (m$^2$/g) were measured by the methods described above. The orientation and the specific surface area were respectively measured before and after a press test by an autograph. The results are shown in the table.

(Press Test)

A press test was performed on each of the negative electrode materials.

Specifically, a die having a diameter of 15 mm was filled with 3.0 g of a sample and compressed at a constant speed of 10 mm/min using an AUTOGRAPH (manufactured by Shimadzu Corporation). In this compression, a distance from a bottom surface of the sample to a press surface was measured, and this distance was multiplied by a bottom area of the die (1.767 cm$^2$) to calculate a density during pressing from a volume of the sample. A pressing hammer of an autograph was equipped with a load cell and measured an applied pressure when a predetermined density was reached. Table 1 shows a pressure A when a density of the sample reached 1.35 g/cm³, a pressure B when a density thereof reached 1.70 g/cm³, and a value C obtained from these pressures (pressure B−pressure A)/(1.70−1.35).
(Progression of Orientation)

A value (a/b), which was obtained by dividing an orientation a measured for the negative electrode material after the press test by an orientation b measured for the negative electrode material before the press test, was calculated as an index of a degree of progression of orientation of the negative electrode material by pressing. The results are shown in Table 1.

(2) Production and Evaluation of Negative Electrode

A negative electrode was produced using the produced negative electrode material. Specifically, water was added to 98 parts by mass of the negative electrode material, 1 part by mass of styrene-butadiene rubber (BM-400B, manufactured by Zeon Corporation), and 1 part by mass of carboxymethyl cellulose (CMC2200, manufactured by Daicel Co., Ltd.) to produce a slurry. This slurry was applied to a current collector (copper foil having a thickness of 10 μm) and dried in the atmosphere at 110° C. for 1 hour to produce a negative electrode before the press test. Next, the current collector and the negative electrode were integrated by a roll press under conditions in which a coating material (active material) had a predetermined electrode density (1.70 g/cm³), and thereby a negative electrode after the press test was produced.

(3) Production and Evaluation of Cell for Evaluation

A charge capacity and a discharge capacity of the cell for evaluation produced using the produced negative electrode were measured, and an initial charge and discharge efficiency was calculated. The results are shown in Table 1.

As the evaluation cell, a 2016 type coin cell was used, which was produced using the negative electrode obtained above, metallic lithium as a positive electrode, a mixed solution of ethylene carbonate/ethyl methyl carbonate (3/7 volume ratio) and vinylene carbonate (0.5% by mass) which contained 1.0 M $LiPF_6$ as an electrolyte solution, a polyethylene microporous membrane having a thickness of 25 μm as a separator, and a copper plate having a thickness of 230 μm as a spacer.

(Charge Capacity and Discharge Capacity)

Measurement of a charge and discharge capacity (initial charge and discharge capacity) was performed under conditions of sample mass: 15.4 mg; electrode area: 1.54 cm²; measurement temperature: 25° C.; charge conditions: constant current charge of 0.434 mA, constant voltage charge of 0 V (Li/Li⁺), and cut current of 0.043 mA; discharge conditions: constant current discharge of 0.434 mA, cut voltage of 1.5 V (Li/Li⁺); and pause time: 30 minutes each time of charge and discharge switching. The discharge capacity was measured under the above charge and discharge conditions. The results are shown in Table 1.

(Initial Efficiency)

The initial efficiency was defined as a ratio (%) of a value of the discharge capacity (Ah/kg) to a value of the measured charge capacity (Ah/kg). The results are shown in Table 1.

(Discharge Capacity Retention Rate)

A discharge capacity retention rate was defined as a ratio (%) of a value of a discharge capacity at the 40th cycle to a value of the discharge capacity at the first time after performing 40 cycles of charging and discharging under the same conditions as above. The results are shown in Table 1.

(Discharge Load Characteristics)

The discharge load characteristics were as follows: 1.0C (5.42 mA) at the 4th cycle, 2.0C (10.85 mA) at the 5th cycle, and 2.5C (13.56 mA) at the 6th cycle after the 3rd cycle under the same conditions as the measurement of the initial charge and discharge capacity. It was carried out under a discharge condition of a cut voltage of 1.5 V. The charging conditions were the same throughout. The discharge load characteristic (%) was obtained from the following formula. The results are shown in Table 1.

Discharge load characteristics=6th cycle (2.5C) discharge capacity/3rd cycle (0.08C) discharge capacity×100

(Increase in Irreversible Capacity)

The increase in irreversible capacity (Ah/kg) was calculated by the following formula as an index of the deterioration of the negative electrode material due to pressing. The results are shown in Table 1.

Increase in irreversible capacity=((charge capacity after press test−discharge capacity after press test)−(charge capacity before press test−discharge capacity before press test)

TABLE 1

| | | Before press test | | After press test | | Press test | | | Progression |
| | Negative electrode material | Oil absorption capacity [mL/100 g] | Orientation b I(002)/I(110) | Specific surface area [m²/g] | Orientation a I(002)/I(110) | Specific surface area [m²/g] | Pressure A [kN/cm²] | Pressure B [kN/cm²] | C [(B−A)/0.35] | of orientation [a/b] |
|---|---|---|---|---|---|---|---|---|---|---|
| Example 1 | 1 | 61 | 68 | 4.0 | 69 | 3.2 | 0.41 | 1.53 | 3.2 | 1.0 |
| Example 2 | 2 | 50 | 79 | 2.5 | 75 | 1.7 | 0.75 | 2.33 | 4.5 | 0.9 |
| Example 3 | 3 | 57 | 72 | 4.8 | 83 | 5.0 | 0.52 | 1.78 | 3.6 | 1.2 |
| Example 4 | 4 | 50 | 97 | 2.7 | 120 | 2.5 | 0.85 | 2.73 | 5.4 | 1.2 |
| Example 5 | 5 | 52 | 93 | 2.9 | 108 | 2.7 | 0.85 | 2.69 | 5.3 | 1.2 |
| Example 6 | 6 | 92 | 55 | 7.2 | 136 | 5.7 | 0.84 | 2.13 | 3.7 | 2.5 |
| Example 7 | 7 | 61 | 62 | 5.3 | 142 | 4.8 | 0.78 | 2.24 | 4.2 | 2.3 |
| Example 8 | 8 | 70 | 91 | 2.7 | 104 | 3.1 | 0.90 | 2.55 | 4.7 | 1.1 |
| Example 9 | 9 | 54 | 98 | 2.6 | 119 | 2.7 | 0.98 | 2.73 | 5.0 | 1.2 |
| Example 10 | 10 | 63 | 85 | 4.3 | 114 | 4.6 | 0.95 | 2.66 | 4.9 | 1.3 |
| Example 11 | 11 | 60 | 98 | 3.9 | 119 | 3.9 | 0.82 | 2.57 | 5.0 | 1.2 |
| Comparative Example 1 | C1 | 40 | 69 | 2.2 | 99 | 2.5 | 1.02 | 3.25 | 6.3 | 1.4 |
| Comparative Example 2 | C2 | 47 | 104 | 2.4 | 145 | 2.6 | 1.07 | 3.16 | 6.0 | 1.4 |
| Comparative Example 3 | C3 | 48 | 100 | 2.6 | 176 | 2.5 | 0.98 | 2.99 | 5.7 | 1.8 |

TABLE 1-continued

| | | | | | | | | | |
|---|---|---|---|---|---|---|---|---|---|
| Comparative Example 4 | C4 | 49 | 103 | 2.2 | 164 | 2.5 | 1.06 | 3.12 | 5.9 | 1.6 |
| Comparative Example 5 | C5 | 52 | 101 | 2.3 | 168 | 2.6 | 1.01 | 2.99 | 5.7 | 1.7 |
| Comparative Example 6 | C6 | 46 | 72 | 4.3 | 102 | 5.1 | 1.35 | 3.87 | 7.2 | 1.4 |

| | Battery characteristics | | | | | | | | |
|---|---|---|---|---|---|---|---|---|---|
| | Before press test | | | After press test | | | | | |
| | Charge capacity [Ah/kg] | Discharge efficiency [Ah/kg] | Initial capacity [%] | Charge capacity [Ah/kg] | Discharge capacity [Ah/kg] | Initial efficiency [%] | Discharge load characteristics (2.5 C.) [%] | Discharge capacity retention rate [%] | Increase in irreversible capacity [Ah/kg] |
| Example 1 | 377 | 364 | 96.5 | 386 | 362 | 93.9 | 77 | 97 | 11 |
| Example 2 | 363 | 350 | 96.4 | 372 | 348 | 93.5 | 94 | 98 | 11 |
| Example 3 | 373 | 358 | 95.9 | 379 | 353 | 93.2 | 74 | 97 | 15 |
| Example 4 | 377 | 363 | 96.2 | 390 | 361 | 92.5 | 89 | 95 | 13 |
| Example 5 | 378 | 363 | 96.1 | 387 | 359 | 92.7 | 89 | 95 | 12 |
| Example 6 | 376 | 363 | 96.7 | 381 | 356 | 93.4 | 80 | 97 | 14 |
| Example 7 | 367 | 355 | 96.7 | 378 | 352 | 93.1 | 86 | 98 | 20 |
| Example 8 | 376 | 362 | 96.3 | 394 | 360 | 91.3 | 92 | 94 | 18 |
| Example 9 | 367 | 354 | 96.3 | 390 | 359 | 92.0 | 91 | 93 | 21 |
| Example 10 | 375 | 357 | 95.2 | 385 | 353 | 91.7 | 90 | 95 | 14 |
| Example 11 | 380 | 363 | 95.5 | 392 | 362 | 92.4 | 91 | 97 | 13 |
| Comparative Example 1 | 379 | 363 | 95.9 | 398 | 361 | 90.8 | 84 | 89 | 21 |
| Comparative Example 2 | 379 | 363 | 95.9 | 396 | 359 | 90.6 | 71 | 83 | 21 |
| Comparative Example 3 | 378 | 363 | 96.0 | 392 | 357 | 91.0 | 64 | 89 | 20 |
| Comparative Example 4 | 378 | 363 | 96.0 | 395 | 359 | 90.9 | 68 | 84 | 21 |
| Comparative Example 5 | 378 | 363 | 96.1 | 393 | 358 | 91.2 | 65 | 86 | 20 |
| Comparative Example 6 | 380 | 362 | 95.3 | 397 | 358 | 90.2 | 93 | 78 | 21 |

As shown in the table, in the lithium ion secondary battery produced using the negative electrode material in which a value C obtained in the press test was 5.5 or less, both the initial efficiency and the discharge capacity retention rate after 40 cycles were evaluated as favorable, as compared to the lithium ion secondary battery produced using the negative electrode material in which a value C obtained in the press test exceeded 5.5.

Based on the results above, it was found that the negative electrode material having a value C of 5.5 or less obtained in the press test maintained good charge and discharge efficiency even when the density was increased.

The invention claimed is:

1. A production method for a negative electrode for lithium ion secondary batteries, the method comprising:
    preparing a negative electrode material that contains graphite secondary particles in which a plurality of flat graphite particles and a plurality of spheroidal graphite particles are chemically bonded by graphite carbon, and the plurality of flat graphite particles in a state of being chemically bonded by the graphite carbon such that main surfaces thereof are not parallel; and
    measuring a value C of the negative electrode material obtained from a pressure A and a pressure B in the following formula:

$C = (\text{pressure } B - \text{pressure } A)/(1.70 - 1.35)$, where the pressure A (kN/cm$^2$) is defined as a pressure at which a density of 1.35 g/cm$^3$ is obtained when a 3.0 g specimen packed into a column space having a diameter of 15 mm is pressed down at a rate of 10 mm/min, and the pressure B (kN/cm$^2$) is defined as a pressure at which a density of 1.70 g/cm$^3$ is obtained, and
    wherein the negative electrode material used for the method has the value C of 5.5 or less.

2. The production method according to claim 1, wherein the negative electrode material used for the method has the value C of 3.7 or less.

* * * * *